US012699576B2

(12) United States Patent
Okada et al.

(10) Patent No.: US 12,699,576 B2
(45) Date of Patent: Aug. 4, 2026

(54) REDUCING A TOTAL AMOUNT OF MEMORY USAGE OF AN EDGE DEVICE BY SWAPPING APPLICATION LOGICS

(71) Applicant: INTERNATIONAL BUSINESS MACHINES CORPORATION, Armonk, NY (US)

(72) Inventors: Masakuni Okada, Abiko (JP); Hayato Uenohara, Funabashi (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 559 days.

(21) Appl. No.: 18/327,401

(22) Filed: Jun. 1, 2023

(65) Prior Publication Data

US 2024/0403072 A1      Dec. 5, 2024

(51) Int. Cl.
*G06F 9/445*          (2018.01)
*G06F 9/50*            (2006.01)

(52) U.S. Cl.
CPC ...... *G06F 9/44594* (2013.01); *G06F 9/44521* (2013.01); *G06F 9/5016* (2013.01)

(58) Field of Classification Search
CPC . G06F 9/44594; G06F 9/44521; G06F 9/5016
USPC ........................................ 718/104
See application file for complete search history.

(56) References Cited

U.S. PATENT DOCUMENTS

| | | | |
|---|---|---|---|
| 11,436,362 B1 * | 9/2022 | Carru ................. | G06F 21/6227 |
| 2018/0336060 A1 * | 11/2018 | Liu ....................... | G06F 3/0481 |
| 2019/0370009 A1 | 12/2019 | Venkatraman et al. | |
| 2021/0294643 A1 | 9/2021 | Kaku et al. | |
| 2022/0019453 A1 | 1/2022 | Okada et al. | |
| 2022/0383188 A1 | 12/2022 | Ananthanarayanan et al. | |
| 2025/0231824 A1 * | 7/2025 | Bessette ................. | G06F 9/547 |

OTHER PUBLICATIONS

Zobaed et al., "Edge-MultiAI: Multi-Tenancy of Latency-Sensitive Deep Learning Applications on Edge", arXiv, arXiv:2211.07130v1, Nov. 14, 2022, pp. 1-10.

(Continued)

*Primary Examiner* — Pierre Vital
*Assistant Examiner* — Daniel Trainor
(74) *Attorney, Agent, or Firm* — Konrad, Raynes, Davda & Victor, LLP; Janaki K. Davda

(57) ABSTRACT

Provided are techniques for reducing a total amount of memory usage of an edge device by swapping application logics. A first application is executed in a foreground on an application framework, where the first application has a shown status. In response to receiving a request to execute a swap application, it is determined that the first application and the swap application use a same screen type and a same non-shareable resource. An application logic of the first application is stored in a suspended application logic pool, where the first application changes from the shown status to a hidden-suspended status. The swap application is executed in the foreground on the application framework, where the swap application has the shown status.

20 Claims, 20 Drawing Sheets

(56) References Cited

OTHER PUBLICATIONS

Mell, P. et al., "The NIST Definition of Cloud Computing (Draft)", Sep. 2011, Computer Security Division Information Technology Laboratory National Institute of Standards and Technology, Total 7 pp.

Mell, P. et al., "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

\* cited by examiner

100

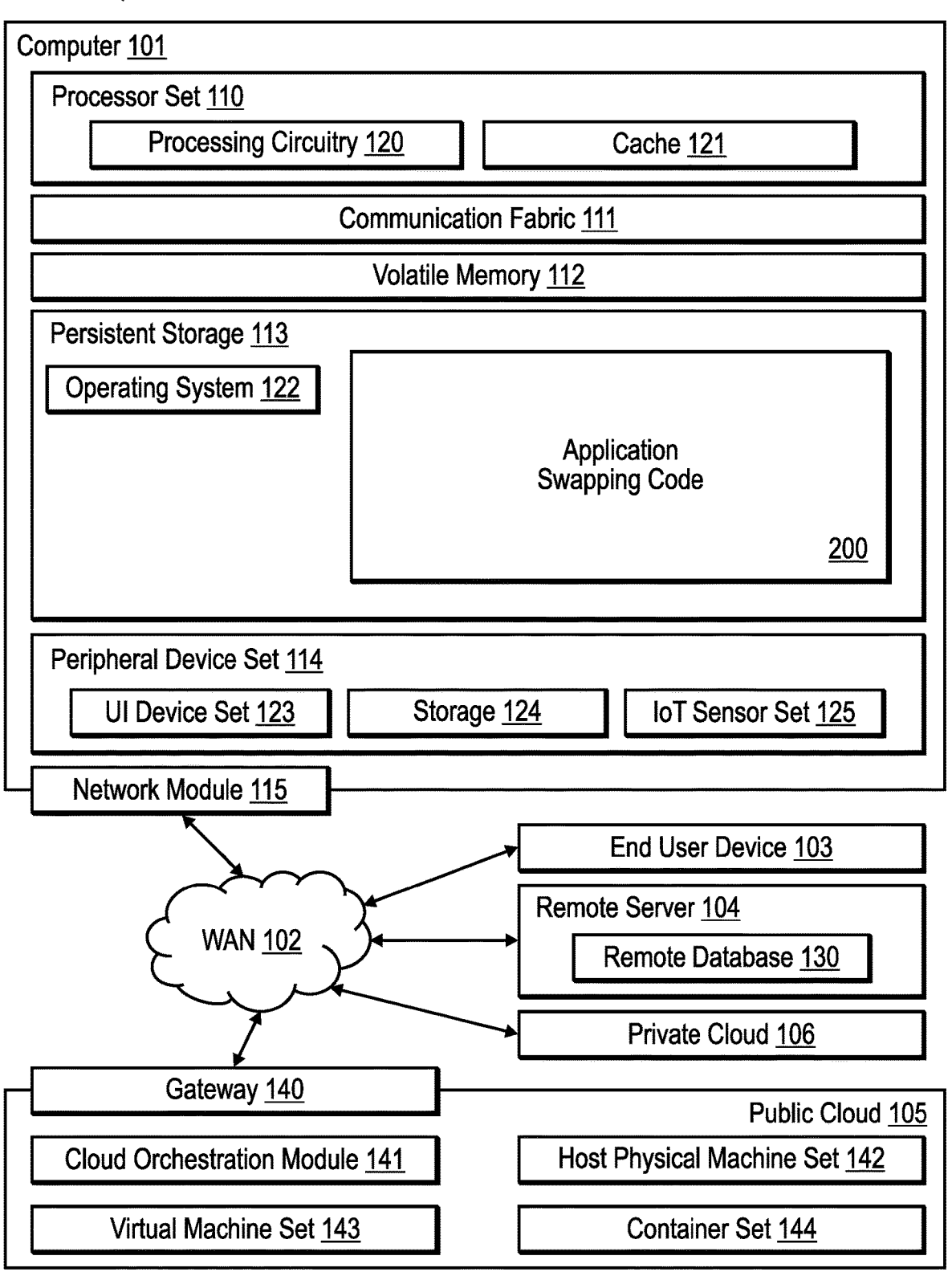

Computer 101

Processor Set 110

Processing Circuitry 120          Cache 121

Communication Fabric 111

Volatile Memory 112

Persistent Storage 113

Operating System 122

Application
Swapping Code

200

Peripheral Device Set 114

UI Device Set 123          Storage 124          IoT Sensor Set 125

Network Module 115

WAN 102

End User Device 103

Remote Server 104

Remote Database 130

Private Cloud 106

Gateway 140

Cloud Orchestration Module 141

Virtual Machine Set 143

Public Cloud 105

Host Physical Machine Set 142

Container Set 144

| Name | Repeatable | Mandatory | Description |
|------|-----------|-----------|-------------|
| 1. Swappable | No | No | App is swappable. |
| 1.2. DefaultScreen | No | Yes | Default screen type. A Human Machine Interface (HMI) may send the screen type to be used based on a trigger of App execution starting. If the default screen type is not specified by HMI, the App is executed by the default screen type. |
| 1.3. Screen | Yes | No | The definitions about what screen type is used for the HMI trigger. These may be defined as pairs of HMITrigger and ScreenType. |
| 1.3.1. HMITrigger | No | Yes | The ID of HMI trigger refers to the operation that the user selects to execute the App. For example, Menu ID, Icon ID, Handle SW ID, etc. |
| 1.3.2. ScreenType | No | Yes | The screen type. If the App is executed by the corresponding trigger, this type of screen is used by the App. |
| 1.3. Resources | Yes | No | The non-shareable resources (Sound, Microphone, Voice Recognition, etc.) to be used while the App is displayed. |

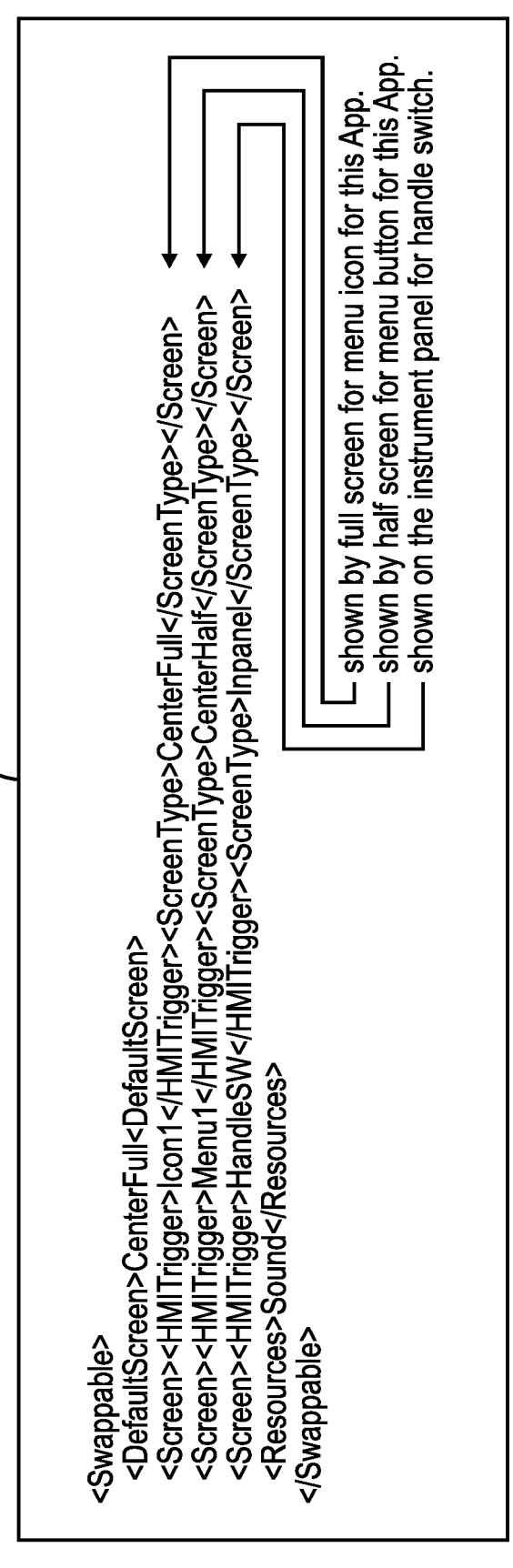

```
<Swappable>
  <DefaultScreen>CenterFull<DefaultScreen>
  <Screen><HMITrigger>Icon1</HMITrigger><ScreenType>CenterFull</ScreenType></Screen>
  <Screen><HMITrigger>Menu1</HMITrigger><ScreenType>CenterHalf</ScreenType></Screen>
  <Screen><HMITrigger>HandleSW</HMITrigger><ScreenType>Inpanel</ScreenType></Screen>
  <Resources>Sound</Resources>
</Swappable>
``` shown by full screen for menu icon for this App.
shown by half screen for menu button for this App.
shown on the instrument panel for handle switch.

FIG. 8B

900 running App status
(of candidates for swapping with new App)

| swap attribute (of new swappable App) | Screen Type: same | | | Screen Type: different |
|---|---|---|---|---|
| | Resource: not used | Resource: used, same | Resource: used, different | |
| Screen Only | X | – | – | – |
| Screen & Resource | – | X | – | – |

X : swap candidate (this running App is selected)
– : not swappable

FIG. 9

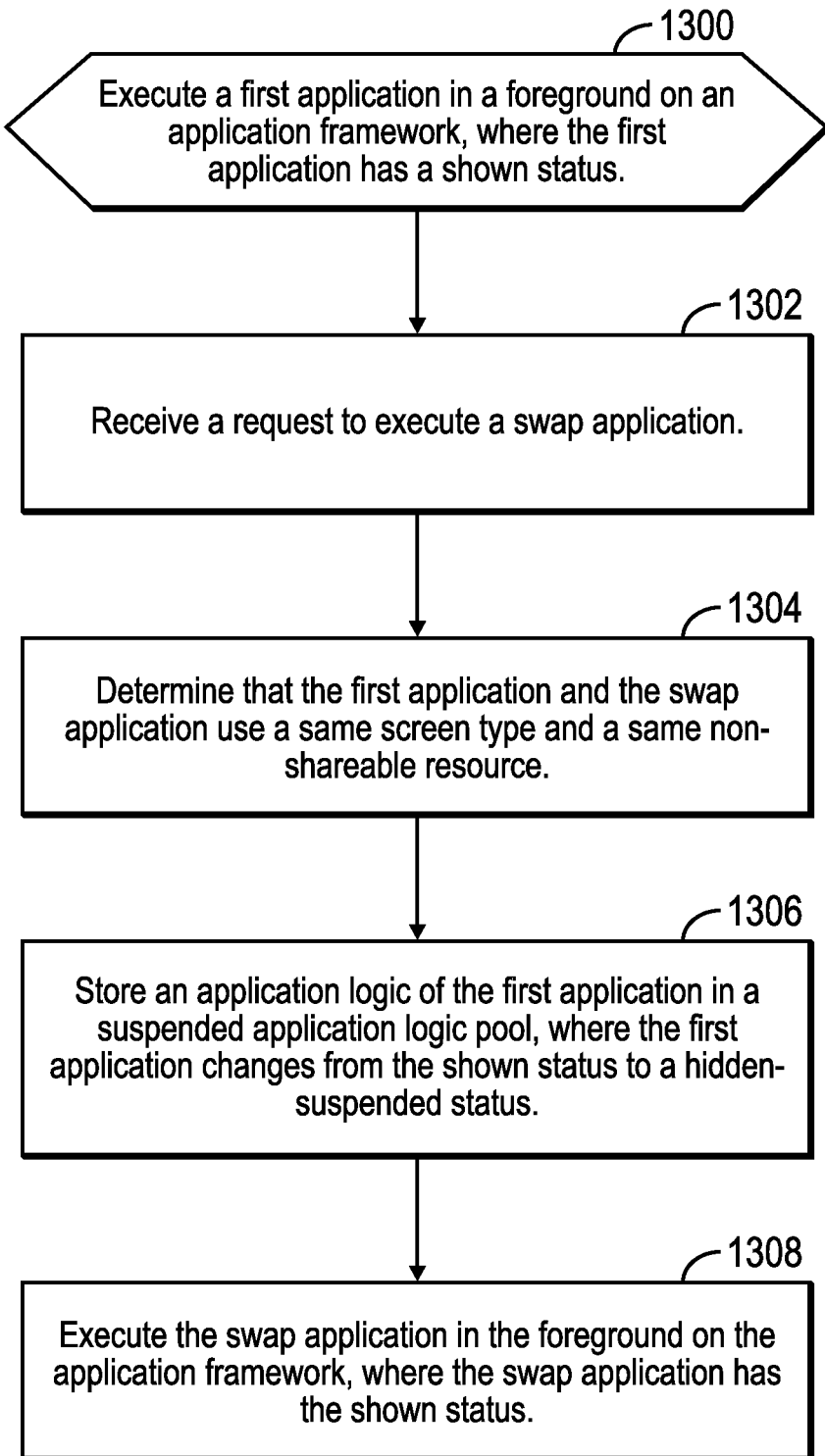

1300

Execute a first application in a foreground on an application framework, where the first application has a shown status.

1302

Receive a request to execute a swap application.

1304

Determine that the first application and the swap application use a same screen type and a same non-shareable resource.

1306

Store an application logic of the first application in a suspended application logic pool, where the first application changes from the shown status to a hidden-suspended status.

1308

Execute the swap application in the foreground on the application framework, where the swap application has the shown status.

FIG. 13

REDUCING A TOTAL AMOUNT OF MEMORY USAGE OF AN EDGE DEVICE BY SWAPPING APPLICATION LOGICS

BACKGROUND

Embodiments of the invention relate to reducing a total amount of memory usage of an edge device by swapping application logic of an executing application with the application logic of a new application on a same application framework when the executing application has a hidden status.

Recently, due to the improvement of Central Processing Units (CPUs), storage, memory, and network performance of an edge device (e.g., a car navigation system), the application management system that expands the edge device capability by installing and updating a new workload as an application (App) via a cloud server is becoming an attractive solution for better user experience. As such, an application management system may provide the capability to implement the new workload as an application, install/update the application from the cloud server, and manage the lifecycle (start, stop, restart, etc.) of the application.

As the number of applications increase, there is a problem of running out of the device's limited memory. To make memory usage smaller, different workloads that do not execute at the same time may be bundled into one application with one, shared application framework. By this bundling, there are fewer application frameworks (e.g., Virtual Machines (VMs)) executing in the environment, and, therefore, the memory that is used by the bundled applications is reduced. This leaves some memory available for additional applications.

Though this workload bundling is easy and effective for making memory usage smaller, it has a disadvantage of having to replace the entire application (1) if one of the workloads has a defect and needs to be fixed, (2) if one of the workloads needs a feature extension, or (3) if a new workload is added to the bundle. Replacing an entire application is difficult, especially for edge devices with user interfaces and in Over-the-Air (OTA) environments. In particular, the application services, including the application framework with the application to be replaced, is stopped while the user is using the car navigation system, even if the update is for a small part of an application. In addition, the network traffic increases, and the application developer has to re-test the entire application even for a partial update (e.g., update of a workload).

As another legacy approach, when memory is being used up, a few applications are terminated to free space in the memory. Typically, the applications executing in the background (i.e., applications that are not displayed) are targets for termination. The application's priority, frequency of usage, etc. may also be used to determine the target application for termination.

However, one disadvantage is that an application that is not executing in the background (i.e., executing in the foreground) is not a target even if such an application becomes a background application after a new application is executed and has a shown status (i.e., the application is executing and displaying information). For example, the shown application can not be terminated before executing a new application because it causes a flicker of the screen display (i.e., what is displayed on the edge device screen). Some default screen (e.g., a navigation map) is displayed for a short time until the new application draws the new screen display.

Another disadvantage may be that the application that is terminated is one that a user did not want terminated. For example, on a smart phone, if a game application is terminated due to a user searching the internet using a browser, the game application restarts from the opening logo.

SUMMARY

In accordance with certain embodiments, a computer-implemented method comprising operations is provided for reducing a total amount of memory usage of an edge device by swapping application logics. In such embodiments, a first application is executed in a foreground on an application framework, where the first application has a shown status. In response to receiving a request to execute a swap application, it is determined that the first application and the swap application use a same screen type and a same non-shareable resource. An application logic of the first application is stored in a suspended application logic pool, where the first application changes from the shown status to a hidden-suspended status. The swap application is executed in the foreground on the application framework, where the swap application has the shown status.

In accordance with other embodiments, a computer program product comprising a computer readable storage medium having program code embodied therewith is provided, where the program code is executable by at least one processor to perform operations for reducing a total amount of memory usage of an edge device by swapping application logics. In such embodiments, a first application is executed in a foreground on an application framework, where the first application has a shown status. In response to receiving a request to execute a swap application, it is determined that the first application and the swap application use a same screen type and a same non-shareable resource. An application logic of the first application is stored in a suspended application logic pool, where the first application changes from the shown status to a hidden-suspended status. The swap application is executed in the foreground on the application framework, where the swap application has the shown status.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for reducing a total amount of memory usage of an edge device by swapping application logics. In such embodiments, a first application is executed in a foreground on an application framework, where the first application has a shown status. In response to receiving a request to execute a swap application, it is determined that the first application and the swap application use a same screen type and a same non-shareable resource. An application logic of the first application is stored in a suspended application logic pool, where the first application changes from the shown status to a hidden-suspended status. The swap application is executed in the foreground on the application framework, where the swap application has the shown status.

BRIEF DESCRIPTION OF THE SEVERAL VIEWS OF THE DRAWINGS

Referring now to the drawings in which like reference numbers represent corresponding parts throughout:

FIG. 1 illustrates a computing environment in accordance with certain embodiments.

FIGS. 8A and 8B illustrate an application's swap attribute in accordance with certain embodiments.

FIG. 9 illustrates a table used to identify swappable applications in accordance with certain embodiments.

FIG. 13 illustrates, in a flowchart, operations for swapping applications in accordance with certain embodiments.

DETAILED DESCRIPTION

Figure 2:
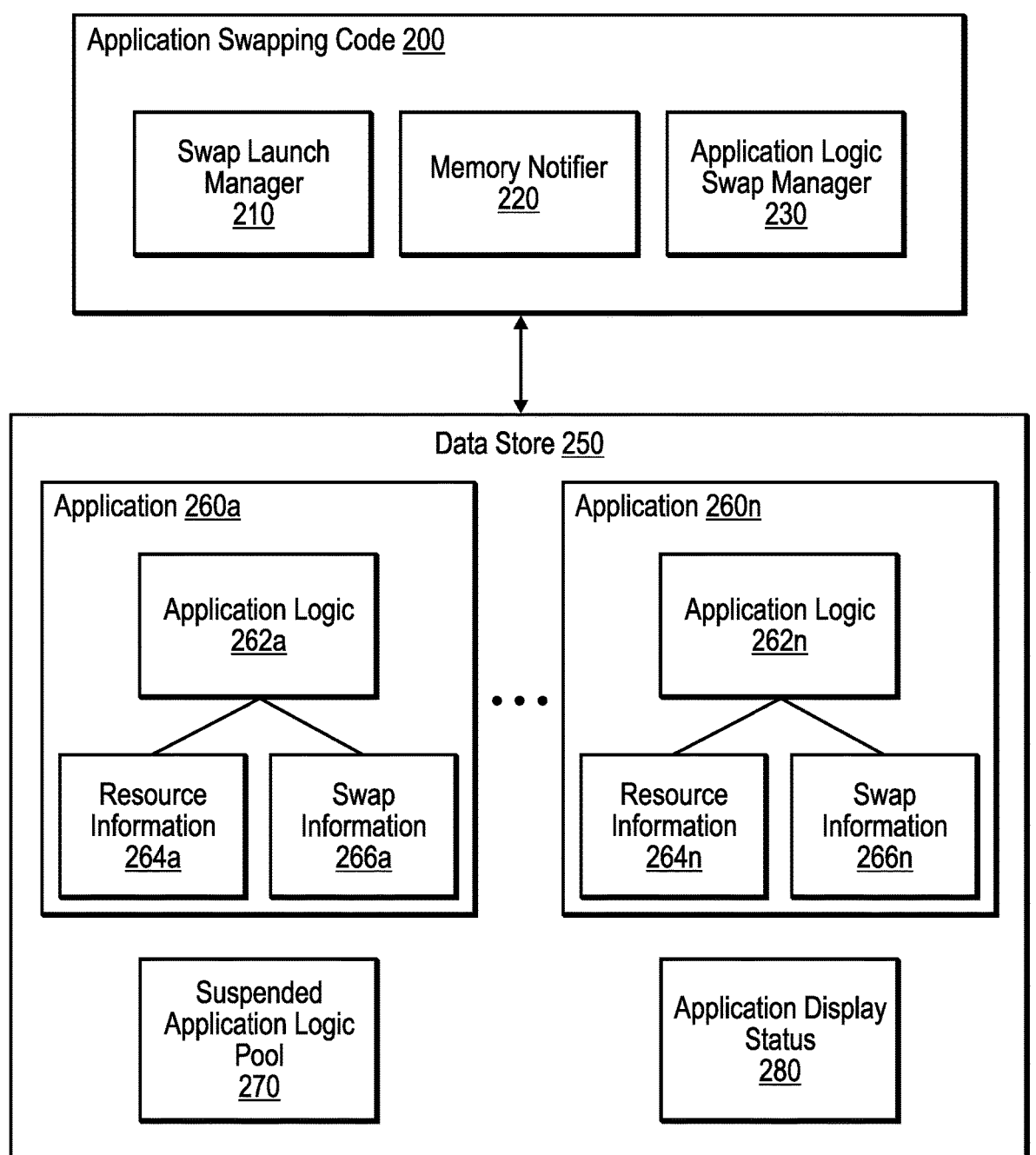
FIG. 2 illustrates, in a block diagram, an application framework and applications in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description herein provides examples of embodiments of the invention, and variations and substitutions may be made in other embodiments. Several examples will now be provided to further clarify various embodiments of the present disclosure:

Example 1: A computer-implemented method comprising executing a first application in a foreground on an application framework, where the first application has a shown status. In response to receiving a request to execute a swap application, the method further comprises determining that the first application and the swap application use a same screen type and a same non-shareable resource. The method further comprises storing an application logic of the first application in a suspended application logic pool, where the first application changes from the shown status to a hidden-suspended status. The method further comprises executing the swap application in the foreground on the application framework, where the swap application has the shown status. Thus, embodiments advantageously allow application logics to share a single application framework and allow swapping the application logics on the single application framework. This allows for execution of the application logics with smaller memory usage. In addition, embodiments advantageously store the application logic of the swapped out application in the suspended application logic pool for efficient retrieval.

Example 2: The limitations of any of Examples 1 and 3-7, where the method further comprises receiving a request to execute the first application. The method further comprises storing an application logic of the swap application in the suspended application logic pool, where the swap application changes from the shown status to the hidden-suspended status. The method further comprises retrieving the application logic of the first application from the suspended application logic pool. The method further comprises executing the first application in the foreground, where the first application changes from the hidden-suspended status to the shown status. Thus, embodiments advantageously enable efficient retrieval of the application logic of the first application for execution, while storing the application logic of the swap application for efficient retrieval.

Example 3: The limitations of any of Examples 1-2 and 4-7, where the method further comprises, in response to receiving a request to execute a non-swap application, the method further comprises executing the first application in a background, where the first application changes from the shown status to a hidden status. The method further comprises executing the non-swap application in the foreground on the application framework, where the non-swap application has the shown status. Thus, embodiments advantageously allow both the first application and the non-swap application to execute at a same time, with the first application executing in the background, while the non-swap application is executing in the foreground.

Example 4: The limitations of any of Examples 1-3 and 5-7, where the method further comprises receiving a request to execute the first application. The method further comprises executing the first application in the foreground, where the first application changes from the hidden status to the shown status. The method further comprises executing the non-swap application in the background, where the non-swap application changes from the shown status to the hidden status. Thus, embodiments advantageously allow both the first application and the non-swap application to execute at a same time, with the first application executing in the foreground, while the non-swap application is executing in the background.

Example 5: The limitations of any of Examples 1-4 and 6-7, where the method further comprises determining that the memory usage exceeds a threshold. The method further comprises discarding one or more application logics in the suspended application logic pool to free space in the memory. Thus, embodiments advantageously create free space in the memory.

Example 6: The limitations of any of Examples 1-5 and 7, where the first application and the second application are grouped to share the application framework. Thus, advantageously, applications that may be swapped are grouped for easy determination of which applications may be swapped.

Example 7: The limitations of any of Examples 1-6, where the first application is attached to the application framework while having the hidden status, and where the first application is detached from the application framework while having the hidden-suspended status. The attaching and detaching from the application framework advantageously enables efficient swapping.

Example 8: A computer program product, the computer program product comprising a computer readable storage medium having program instructions embodied therewith, the program instructions executable by a processor to cause the processor to perform a method according to any one of Examples 1-7. Thus, embodiments advantageously allow application logics to share a single application framework and allow swapping the application logics on the single application framework. This allows for execution of the application logics with smaller memory usage. In addition, embodiments advantageously store the application logic of the swapped out application in the suspended application logic pool for efficient retrieval.

Example 9: A computer system comprising one or more processors, one or more computer-readable memories and one or more computer-readable, tangible storage devices, and program instructions, stored on at least one of the one or more computer-readable, tangible storage devices for execution by at least one of the one or more processors via at least one of the one or more computer-readable memories, to perform a method according to any of Examples 1-7. Thus, embodiments advantageously allow application logics to share a single application framework and allow swapping the application logics on the single application framework. This allows for execution of the application logics with smaller memory usage. In addition, embodiments advantageously store the application logic of the swapped out application in the suspended application logic pool for efficient retrieval.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100 in accordance with certain embodiments. Computing environment 100 contains an example of an environment for the execution of at least some of the computer code involved in performing the inventive methods, such as an application swapping code 200 for reducing a total amount of memory usage of an edge device by swapping application logic. In addition to block 200, computing environment 100 includes, for example, computer 101 (e.g., an edge device), wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The application swapping code 200 reduces a total amount of memory usage of an edge device by swapping application logics of an executing application and of a new application on a same application framework when the executing application becomes hidden. An application may be executed in a background or in a foreground. In certain embodiments, an application executing (i.e., running) in the background is referred to as one having a hidden status (i.e., not displaying content on a display screen, but continuing to execute to, for example, output audio), while an application executing in the foreground is referred to as having a shown status (i.e., displaying content on the display screen).

In certain embodiments, the application swapping code 200 solves the memory shortage problem while overcoming the disadvantages of existing systems. The application swapping code 200 executes applications with smaller memory usage. The application swapping code 200 updates an application (i.e., the logic of the application is updated) without ending the application framework. With embodiments, the part of the logic to be updated is sent to the edge device for the update. In certain embodiments, the update is for a service and each logic for each service is independent so that the developer does not have to consider side effects to other services for the update to one service. In addition, the application swapping code 200 swaps off the memory for hidden applications. Thus, the application swapping code 200 executes applications with a smaller memory, while overcoming the disadvantages of existing systems.

FIG. 2 illustrates, in a block diagram, a computing environment in accordance with certain embodiments. The application swapping code 200 includes a swap launch manager 210, a memory notifier 220, and an application logic swap manager 230. The application swapping code 200 is connected to a data store 250. The data store 250 includes applications 260a . . . 260n with corresponding application logic 262a . . . 262n, resource information 264a . . . 264n, and swap information 266a . . . 266n. The data store 250 also includes suspended application logic pool 270 (for storing each application logic that has been swapped out). In addition, the data store 250 stores an application display status 280 (e.g., an application status of hidden, hidden-suspended or shown for each application, along with other information).

In certain embodiments, the swap launch manager 210 uses the swap information 266a . . . 266n to trigger the application logic swap manager 230 to swap application logic in an application. The memory notifier 220 monitors free space in the memory and notifies the application logic swap manager 230 that memory is filling up so application logics in the suspended application logic pool 270 should be discarded.

Figure 3A:
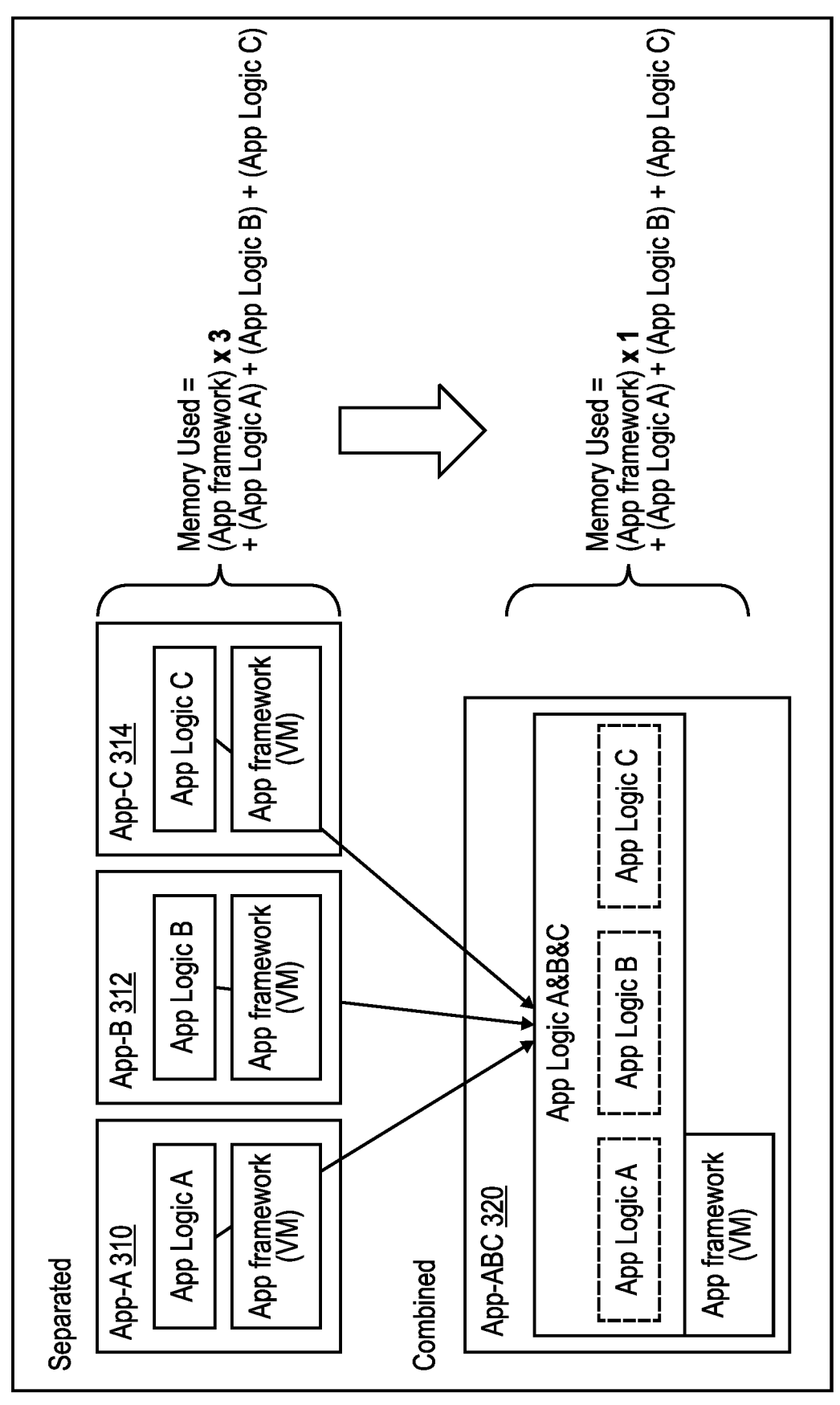
FIGS. 3A and 3B illustrate application logic bundling in accordance with certain embodiments.
Figure 3B:
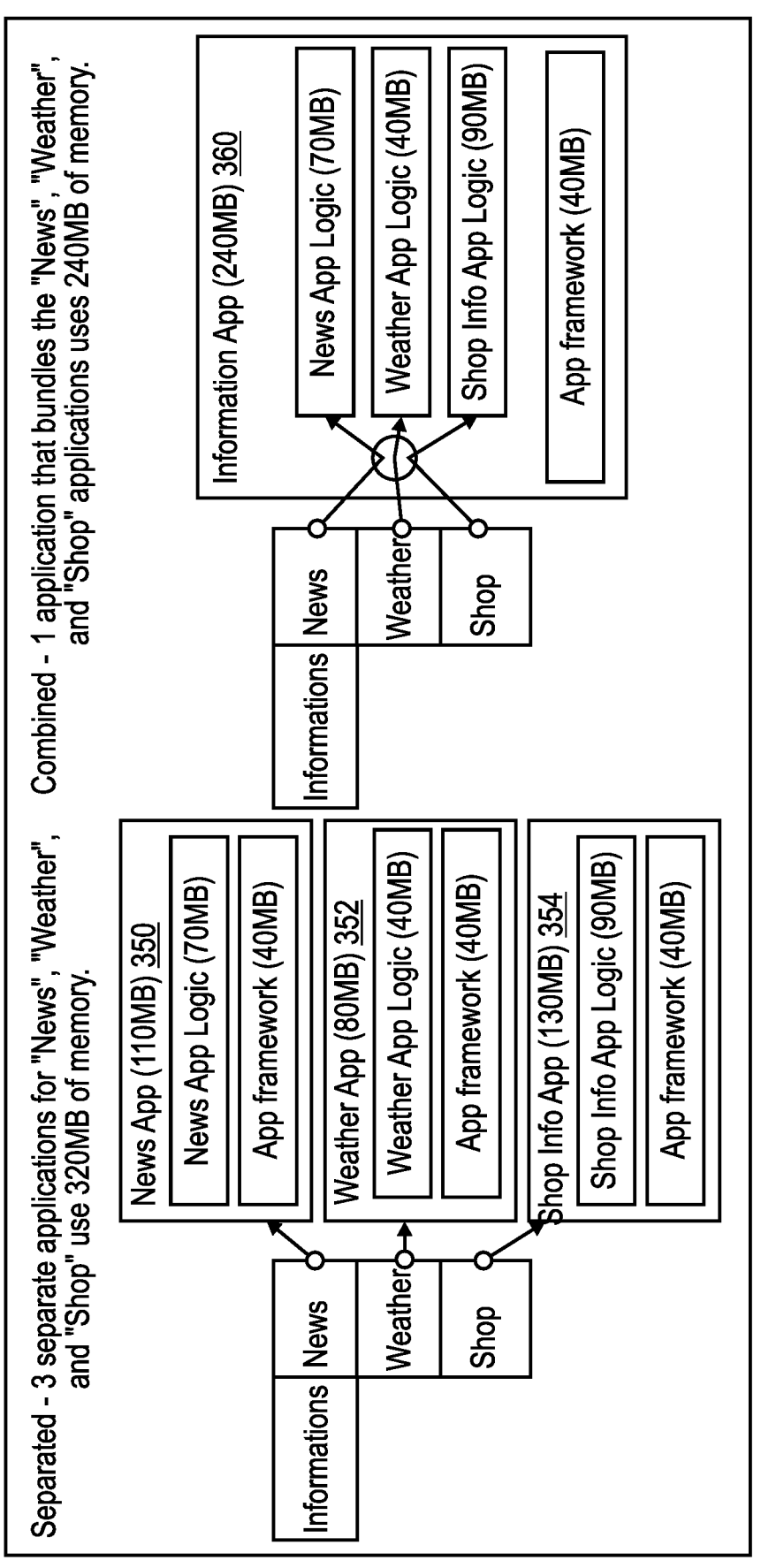

FIGS. 3A and 3B illustrate application logic bundling in accordance with certain embodiments. In FIG. 3A, App-A 310, App-B 312, and App-C 314 are separate applications. Each of the applications 310, 312, 314 includes application logic and an application framework (e.g., a Virtual Machine (VM)). The memory used by the separate applications is based on three application frameworks and the application logic for the three applications. A VM may also be referred to as a base VM. The applications 310, 312, 314 may be bundled (combined) as App-ABC 320, which includes the application logic for each of the applications 310, 312, and 314 and a single application framework (instead of three application frameworks). In certain embodiments, applications 310, 312, 314 do not execute at the same time, and so they may be combined and share one application framework. The memory used by the combined application is based on one application framework and the application logic for the three applications.

In FIG. 3B, a News App 350, a Weather App 352, and a Shop Info App 354 use 320 MegaBytes (MB) of memory as separate applications. However, the combined application Information App 360 uses 240 MB.

In certain embodiments, the application swapping code 200 reduces an application's memory usage by bundling the applications (or the application logics of these applications) that do not execute at the same time as one application that share an application framework. That is, the application swapping code 200 executes the application logic of each application in the bundle on a same application framework (e.g., a VM) as different applications. In certain embodiments, the application swapping code 200 swaps the application logic (i.e., workload logic) based on a trigger of an event that indicates that the application has become hidden (i.e., the application has a hidden status). In certain embodiments, an application lifecycle manager manages the display status and sends the trigger.

The application swapping code 200 attaches the application logic to the base VM to swap the application logic, without terminating the base VM.

In certain embodiments, when a new application is run, the swap launch manager 210 checks whether that application defines a swap attribute, which is stored in the swap information for that application. If the application has a swap attribute, the swap launch manager 210 checks whether the application that may be swapped with the new application is executing. If the application is executing, the swap launch manager 210 sends the application logic swap manager 230 the request to swap the application logic to that of the new application. The application logic swap manager 230 loads the new application logic into memory, attaches the new application logic to the base VM, and executes the new application logic (i.e., the new application logic has a shown status).

In certain embodiments, the swap launch manager 210 initiates swapping the application logic among the application logics that are using the same screen type and the same non-shareable resource (i.e., resources that require exclusive access, such as a microphone device, audio output, etc.). The executing application that is using the same screen type and the same non-shareable resource as the new application is selected as a candidate to be swapped out. That is, the swap launch manager 210 selects the executing application as a candidate based on meeting the following conditions:

(1). the application environment on which the swappable application is executing is using a same screen type as the new application; and (2). if at least one non-shareable resource is defined for the new application's swap attribute, the application environment on which the application is executing is using the same non-shareable resource and meets condition (1).

In certain embodiments, the application logic of the application that was swapped out is pooled in the suspended application logic pool 270 for reuse when that application is executed again. In certain embodiments, if the memory notifier 220 detects that the memory usage exceeds a threshold (i.e., there is little free space left in the memory), and the memory notifier 220 sends the application logic swap manager 230 a notification to discard each application logic in the suspended application logic pool 270. In response to receiving the notification, the application logic swap manager discards the application logics in the suspended application logic pool 270 to free space in memory.

In certain embodiments, the application swap attribute indicates:

(1). Whether the application may be swapped when it is "hidden";

(2). What screen resource that application uses (e.g., in a vehicle system, there are several kinds of screens, and the application indicates which screen the application uses); and (3). What non-shareable resource (e.g., sound, microphone, voice recognition, etc.) the application will use.

In certain embodiments, the application display status 280 includes the following information for each executing application:

(1). Whether the swappable application is executing on this application framework;

(2). The type of screen that application is using;

(3). Whether a non-shareable resource is used; and (4). The application status used for managing swapping.

After the application logic is swapped, the maximum amount of memory that the application may use is updated. Also, the amount of memory used may increase temporarily because two application logics (old and new) are loaded during swapping. Before swapping the application logic, the entire memory amount is checked and if it is insufficient, the swapping is not performed and the execution of the new application fails.

Figure 4:
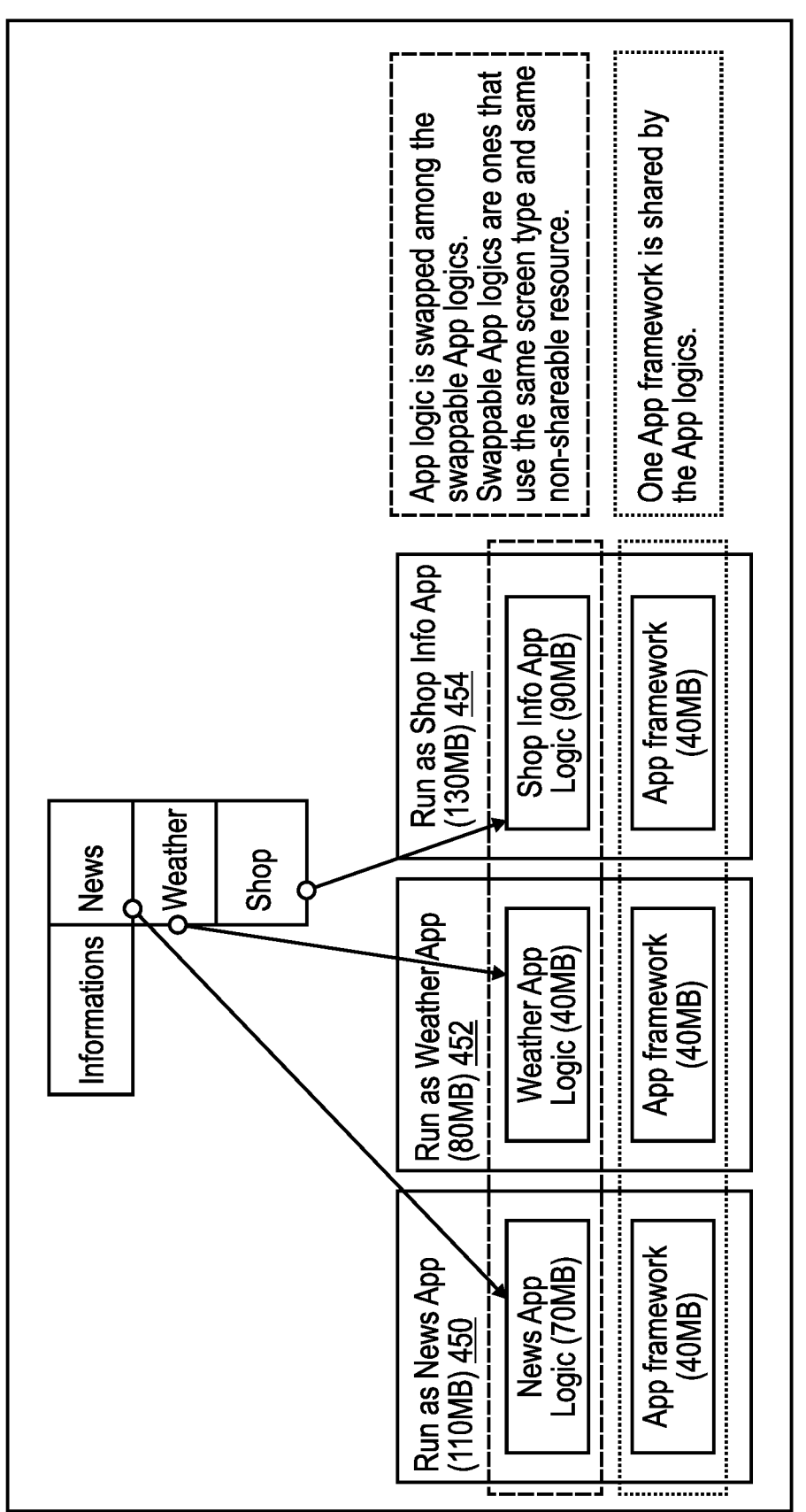
FIG. 4 illustrates application logic swapping in accordance with certain embodiments.

FIG. 4 illustrates application logic swapping in accordance with certain embodiments. In FIG. 4, a News App 450, a Weather App 452, and a Shop Info App 454 may be swapped for each other. In this example, the application logic for the Apps 450, 452, 454 use a same screen type and a same non-shareable resource. With embodiments, the application logic becomes independent, which allows swapping the application logic of one application with the application logic of another application. Also, the same application framework may be shared by the News App 450, the Weather App 452, and the Shop Info App 454. In particular, one of the Apps 450, 452, 454 at a time executes on the application framework, so the most memory used at a time is 130 MP for the Shop Info App 454. In certain embodiments, the Apps 450, 452, 454 are not bundled, while, in other embodiments, the Apps 450, 452, 454 are bundled.

Figure 5:
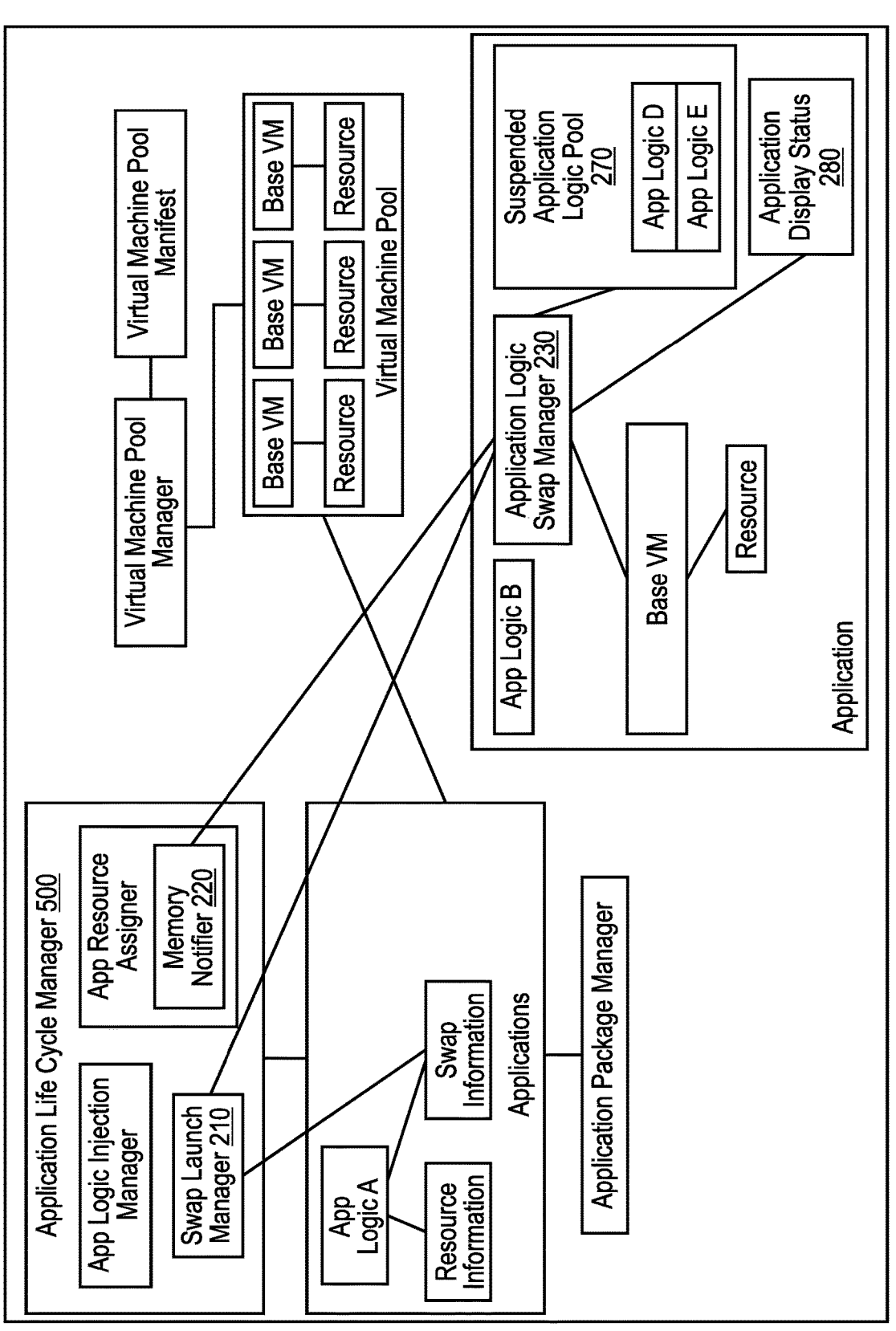
FIG. 5 illustrates, in a block diagram, interaction of components of the application swapping code in accordance with certain embodiments.

FIG. 5 illustrates, in a block diagram, interaction of components of the application swapping code 200 in accordance with certain embodiments. In FIG. 5, the swap launch manager 210 and the memory notifier 220 are part of an application life cycle manager 500. In the example of FIG. 5, App logic A has swap information indicating that App logic A is swappable (e.g., may be swapped with App logic B). In this example, App logic B is executing on the base VM. Also, the application logic swap manager 230 has swapped out (e.g., terminated) App logic D and App logic E and stored App logic D and App logic E in the suspended application logic pool 270. The application logic swap manager 230 also has access to the application display status 280.

Figure 6A:
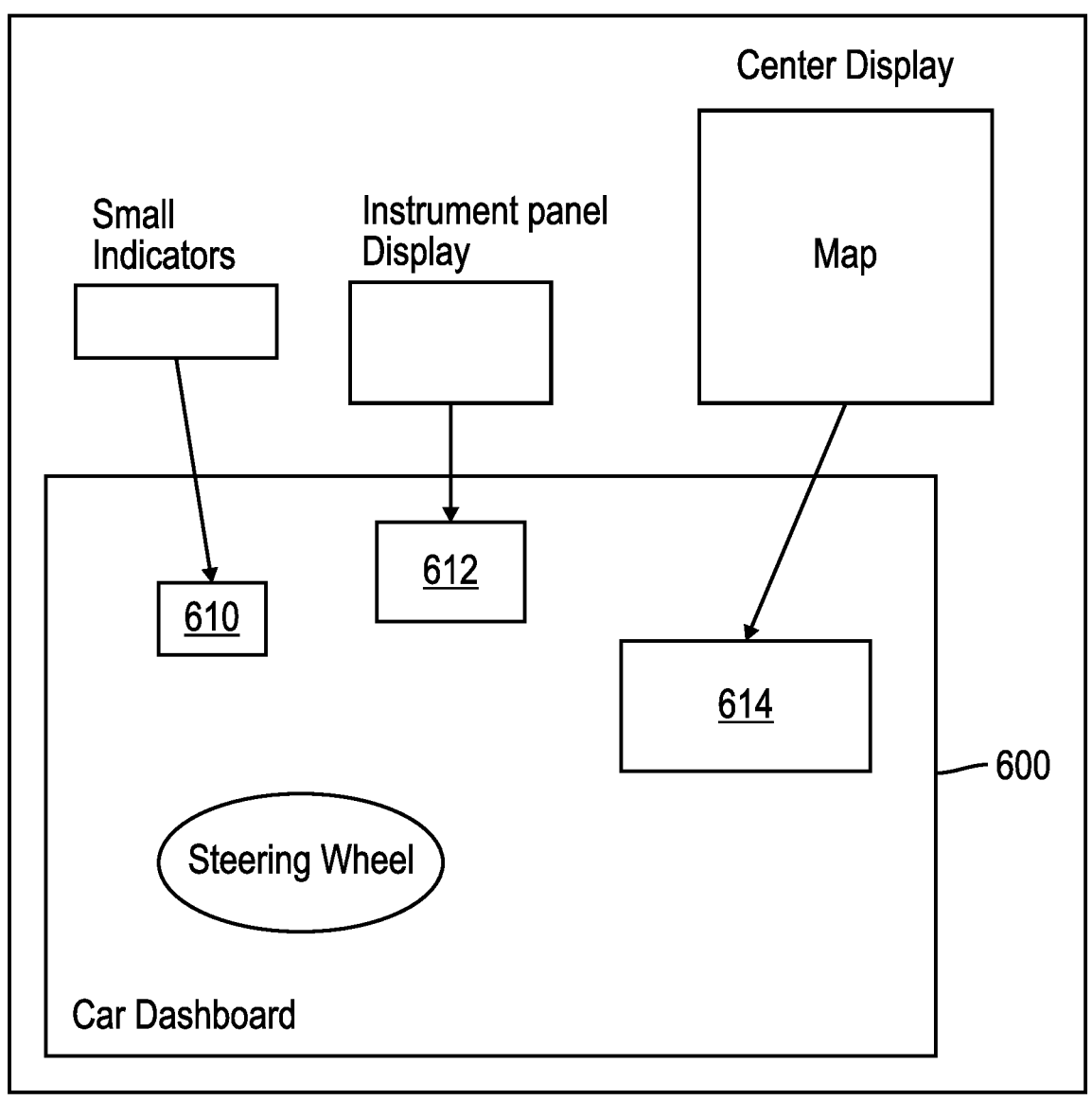
FIGS. 6A and 6B illustrate example screen types and display modes of a car dashboard in accordance with certain embodiments.
Figure 6B:
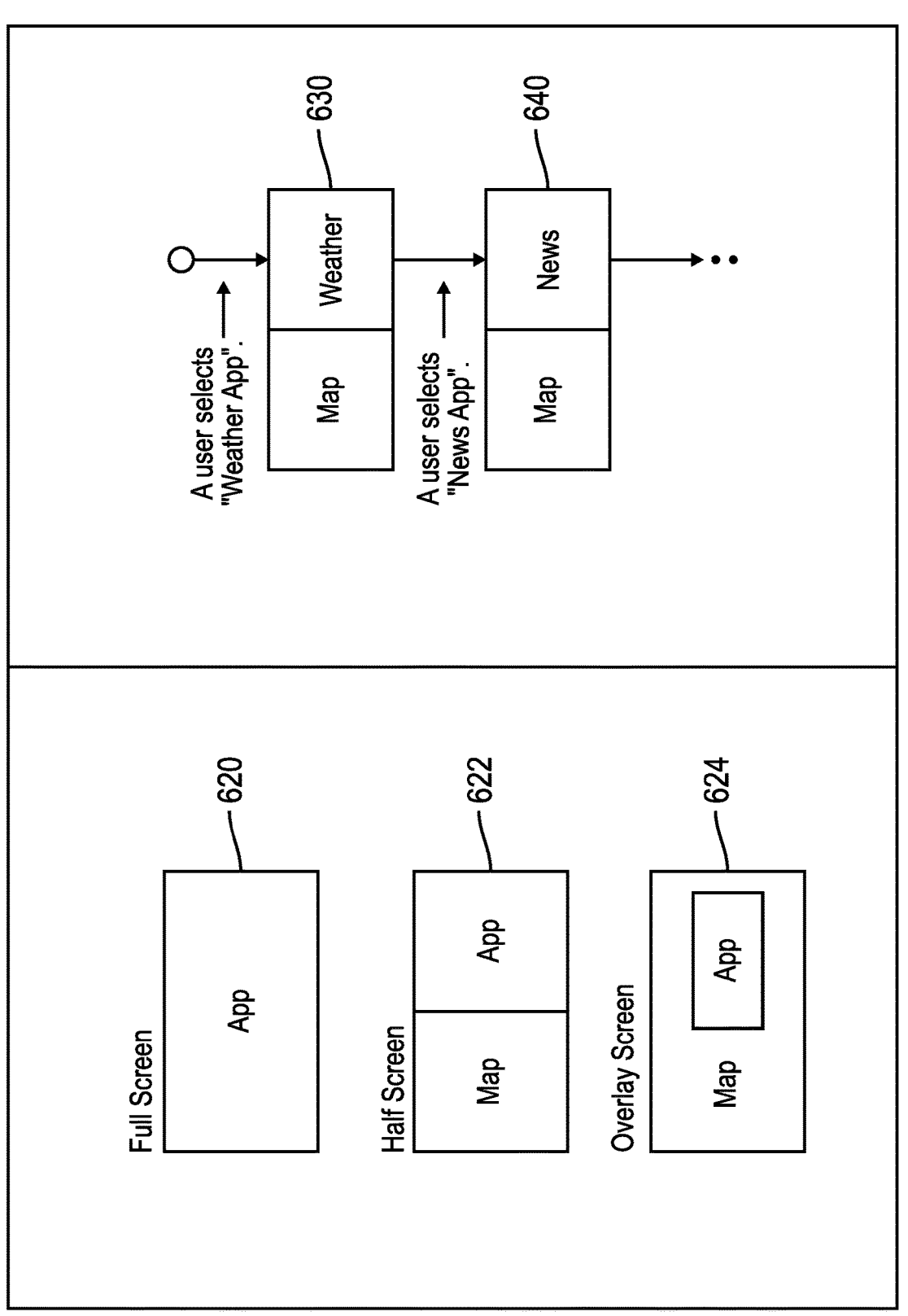

FIGS. 6A and 6B illustrate example screen types and display modes of a car dashboard 600 in accordance with certain embodiments. In FIG. 6A, the car dashboard 600 has several output devices (display screens) that the application may use to display (draw) information. For example, there may be an output device 610 for small indicators, an output device 612 for an instrument panel display, and an output device 614 for a center display (e.g., to display a navigation map).

Each output device 610, 612, 614 may have various display modes for the application to use in the are assigned for that display mode. In FIG. 6B, the output device 614 for the center display may be full screen 620 (e.g., covering the map), half screen 622 (e.g., covering half the map) or overlay screen 624 (e.g., overlaid over the map). In certain embodiments, unlike a computer screen, the output devices 610, 612, 614 may be of a size that one application at a time may use the output device. Therefore, if an application is swapped out for a new application, the new application uses the same area assigned to the application that was swapped out. For example, a weather application 630 initially uses a display area (e.g., half of the display screen), and, when the weather application is swapped out for the news application, the news application 640 uses that display area (e.g., half of the display screen).

Figure 7:
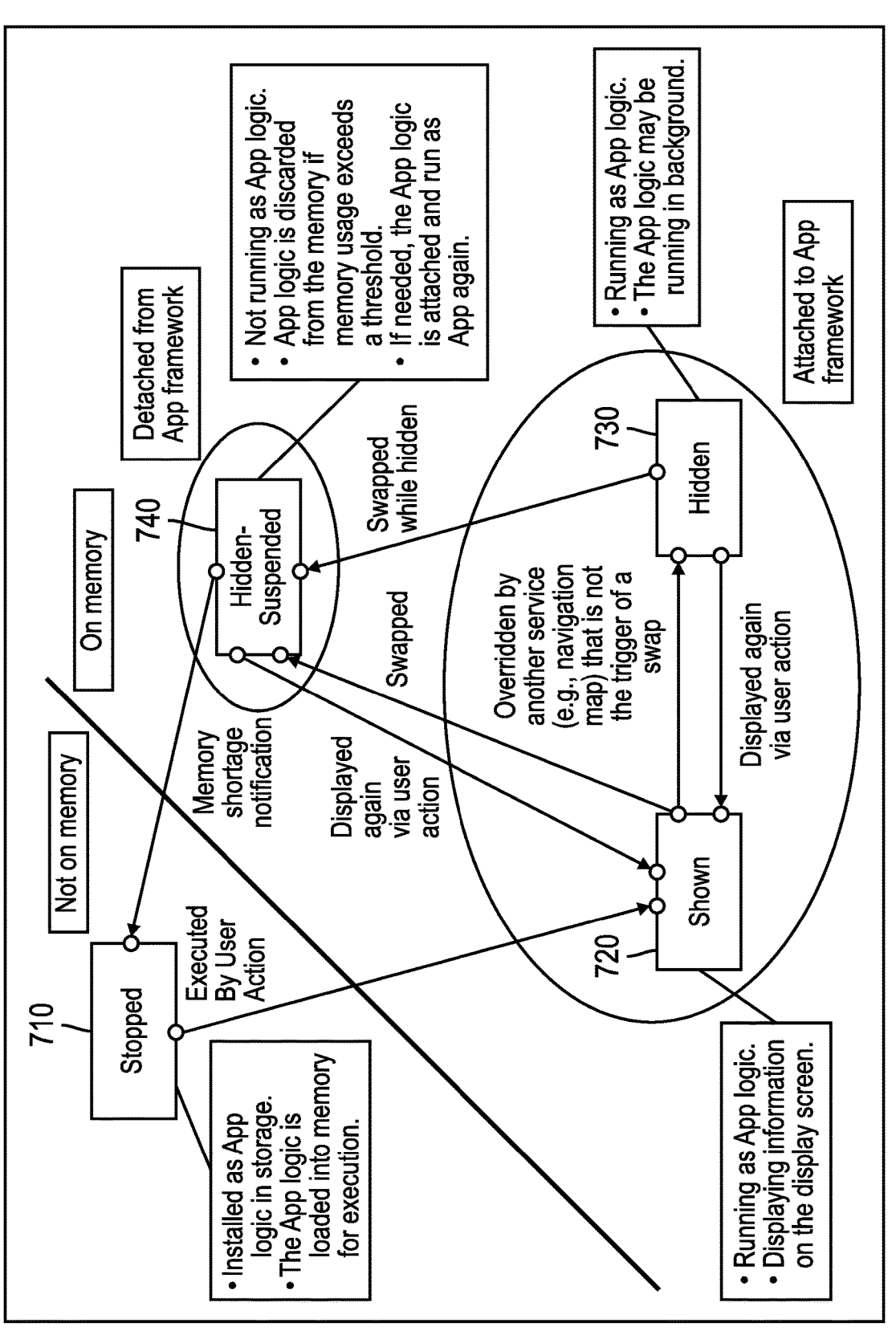
FIG. 7 illustrates an example status chart of application status for swappable application logic in accordance with certain embodiments.

FIG. 7 illustrates an example status chart of application status for swappable application logic in accordance with certain embodiments. In certain embodiments, an application may have a status of stopped, shown, hidden-suspended or hidden. Initially, the application logic has a stopped status 710. The stopped status 710 indicates that the application logic is not executing on memory. The application logic is installed as a file in storage. In response to user action requesting the application be executed, the application logic is loaded into memory and executed.

When the application logic is executing on memory, the application has a shown status 720. The shown status 720 indicates that the application logic is executing and displaying information on a display screen. The application logic may be overridden by another service (e.g., a navigation map) that is not a trigger for a swap, and the application moves to a hidden status 730. The hidden status 730 indicates that the application logic is executing in memory, but may be executing in the background (e.g., an audio playing weather news). In response to user action requesting execution of the application, the application status may move back to shown status 720 from the hidden status 730. In response to the application logic being swapped, the application status moves to hidden-suspended status 740. The hidden-suspended status 740 indicates that the application logic is not executing, that the application logic is stored in the suspended application logic pool 270 (and so the application logic may be retrieved and executed again while stored), and that the application logic may be discarded from the suspended application logic pool 270 to free up space (i.e., because memory usage exceeds a threshold). In response to user action requesting execution of the application, the application status may move back to shown status 720 from the hidden-suspended status 740. Moreover, while having hidden status 730, the application logic may be swapped, and the application moves to hidden-suspended status 740.

In certain embodiments, an application is attached to the application framework while having the hidden status, and the application is detached from the application framework while having the hidden-suspended status.

FIGS. 8A and 8B illustrate an application's swap attribute in accordance with certain embodiments. In FIG. 8A, a table 800 illustrates that the swap attribute includes a default screen, a designated screen ("screen"), a Human Machine Interface (HMI) trigger, a screen type, and non-sharable resources.

FIG. 8B illustrates extensible Markup Language (XML) code 810 of a swap attribute. In the XML code 810, there are different HMI triggers for a menu icon, a menu button, and an instrument panel handle switch.

FIG. 9 illustrates a table 900 used to identify swappable applications in accordance with certain embodiments. Using table 900, the application swapping code 200 determines an appropriate application to be swapped out and replaced with a new application. If the application defines a screen, but no resource is defined, the executing application that has a same screen type as a new application may be swapped out. If the application defines a screen and a resource, the executing application that has a same screen type and a same resource as the new application is swapped out.

Figure 10A:
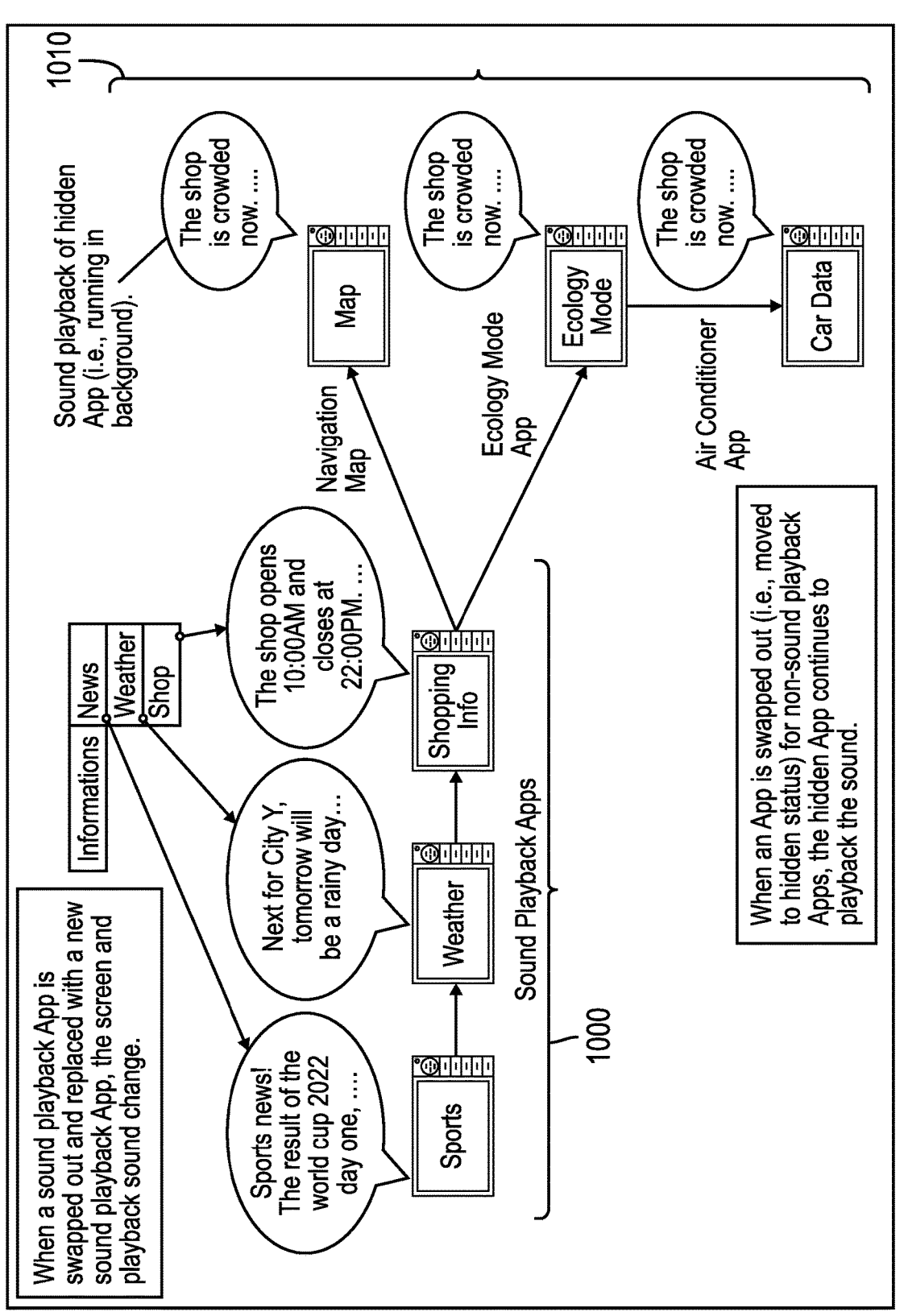
FIGS. 10A, 10B, and 10C illustrate an example with applications that use non-shareable resources in accordance with certain embodiments.

FIG. 10A illustrates an example with applications that use non-shareable resources in accordance with certain embodiments. FIG. 10A illustrates how sound playback applications that use the audio device (a type of non-shareable device) execute (e.g., in a vehicle). With the sound playback applications 1000, when one sound playback application (i.e., a swap App) is swapped out for another sound playback application (i.e., a swap App), the screen and the playback sound (i.e., the content of the sound) change. Also, when a sound playback application is moved to a hidden status for a non-swap application (e.g., such as applications 1010 (i.e., the navigation map, the ecology mode app or the air conditioner app)) that does not use the audio device, then, the sound playback application may continue the sound playback, while not displaying any content on the screen.

Figure 10B:
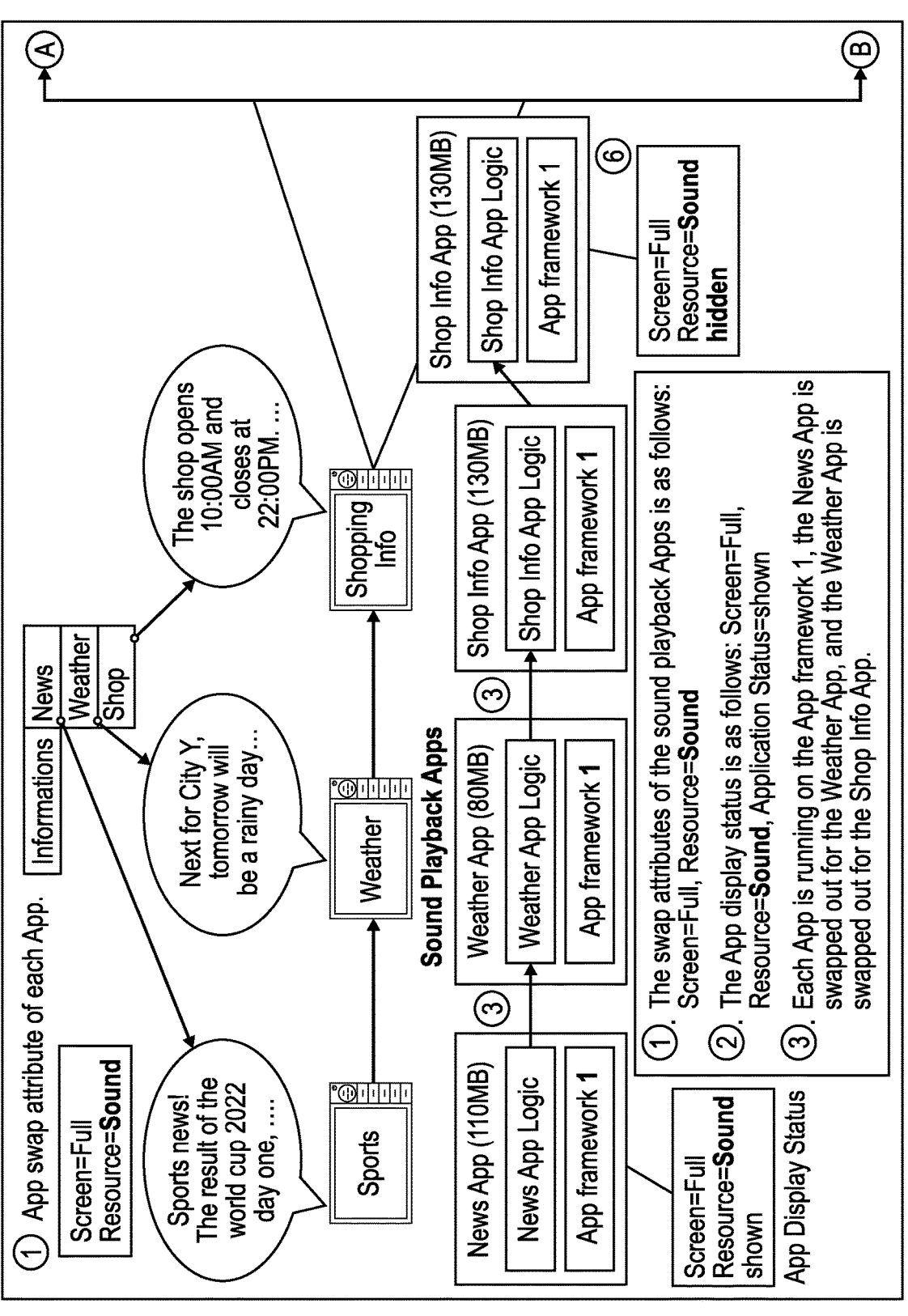
Figure 10C:
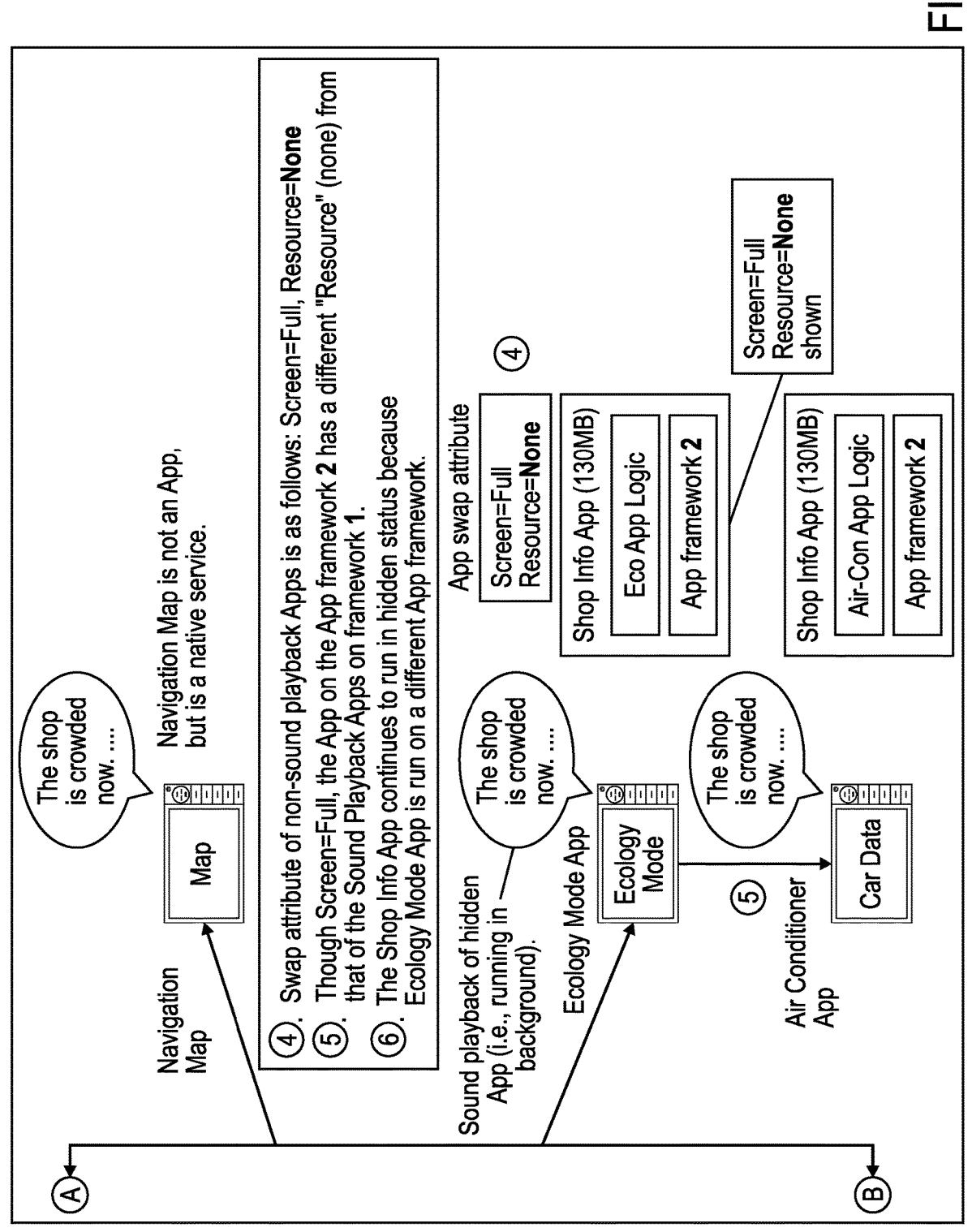

FIGS. 10B and 10C illustrate another example with applications that use non-shareable resources in accordance with certain embodiments. In FIGS. 10B and 10C, the application logic of the news application, the weather application, and the shop information application are swapped on application framework-1. The shop information application has hidden status and executes in the background by continuing to play back sound. With embodiments, application logic of an application is swapped with another application logic of another application that uses the same swap attribute (e.g., screen type and non-sharable resource type "audio device") by grouping these applications (Group1) to execute on the same application framework (in this example App framework1). If the swap attribute differs (as in the ecology mode App (with Eco App Logic) or air conditioner App (with Air-Con app logic), which do not use a non-sharable resource ("audio device"), they may be grouped (Group2) to execute on a different application framework (in this example App framework2). Group1 and Group2 may be managed independently, which allows each group's applications to continue to execute and use non-conflicting non-shareable resources (in this case, the "audio device" to continue to play back sound).

In certain embodiments, applications may be small microservices that are executed as containers on the edge device. In such embodiments, the application swapping code 200 may be used to improve memory usage.

In certain embodiments, the application swapping code 200 is applicable to edge devices, such as a car navigation system, a connected home appliance, a connected manufacturing machine, etc.

Figure 11A:
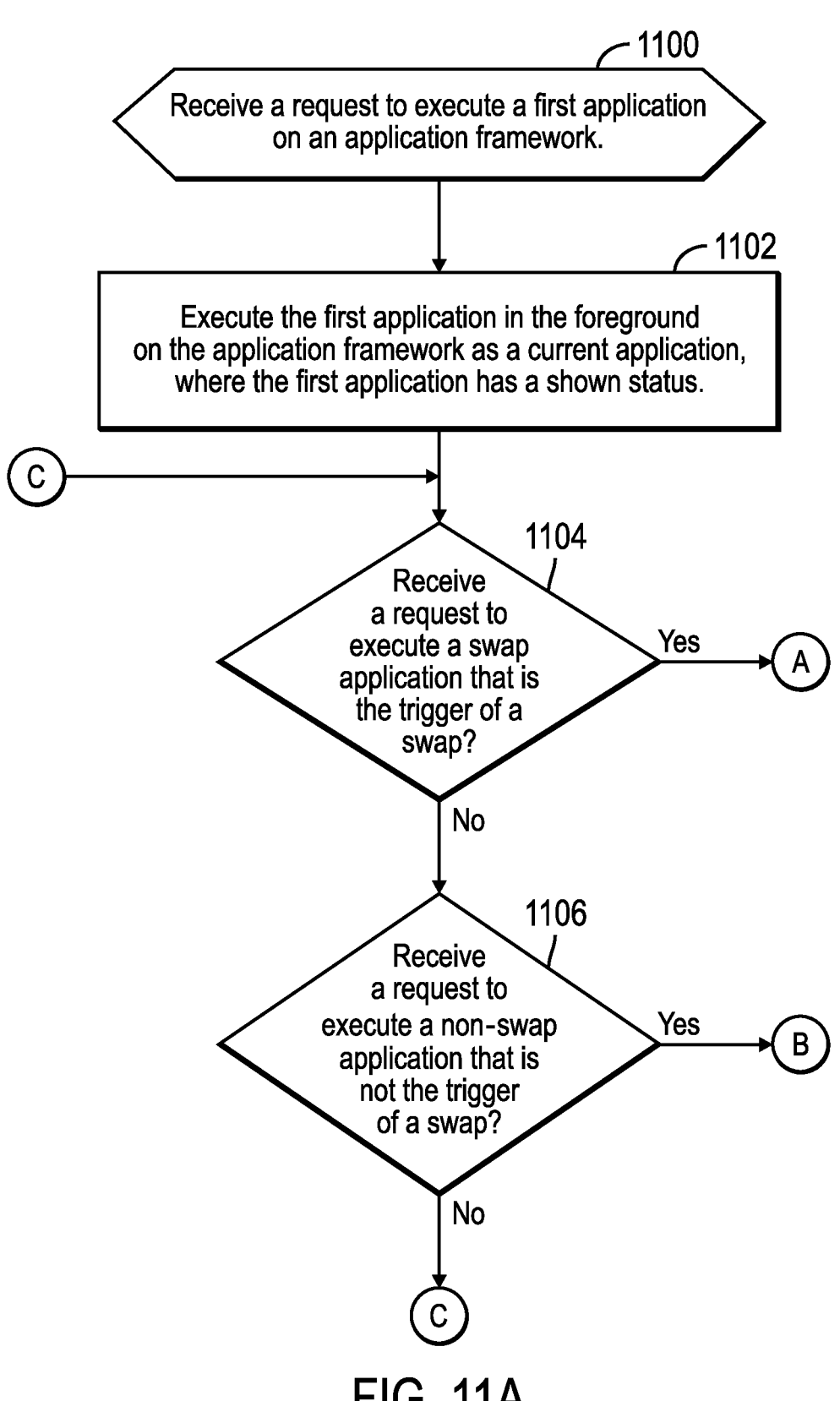
FIGS. 11A, 11B, and 11C illustrate, in a flowchart, operations for executing applications on a same framework in accordance with certain embodiments.
Figure 11B:
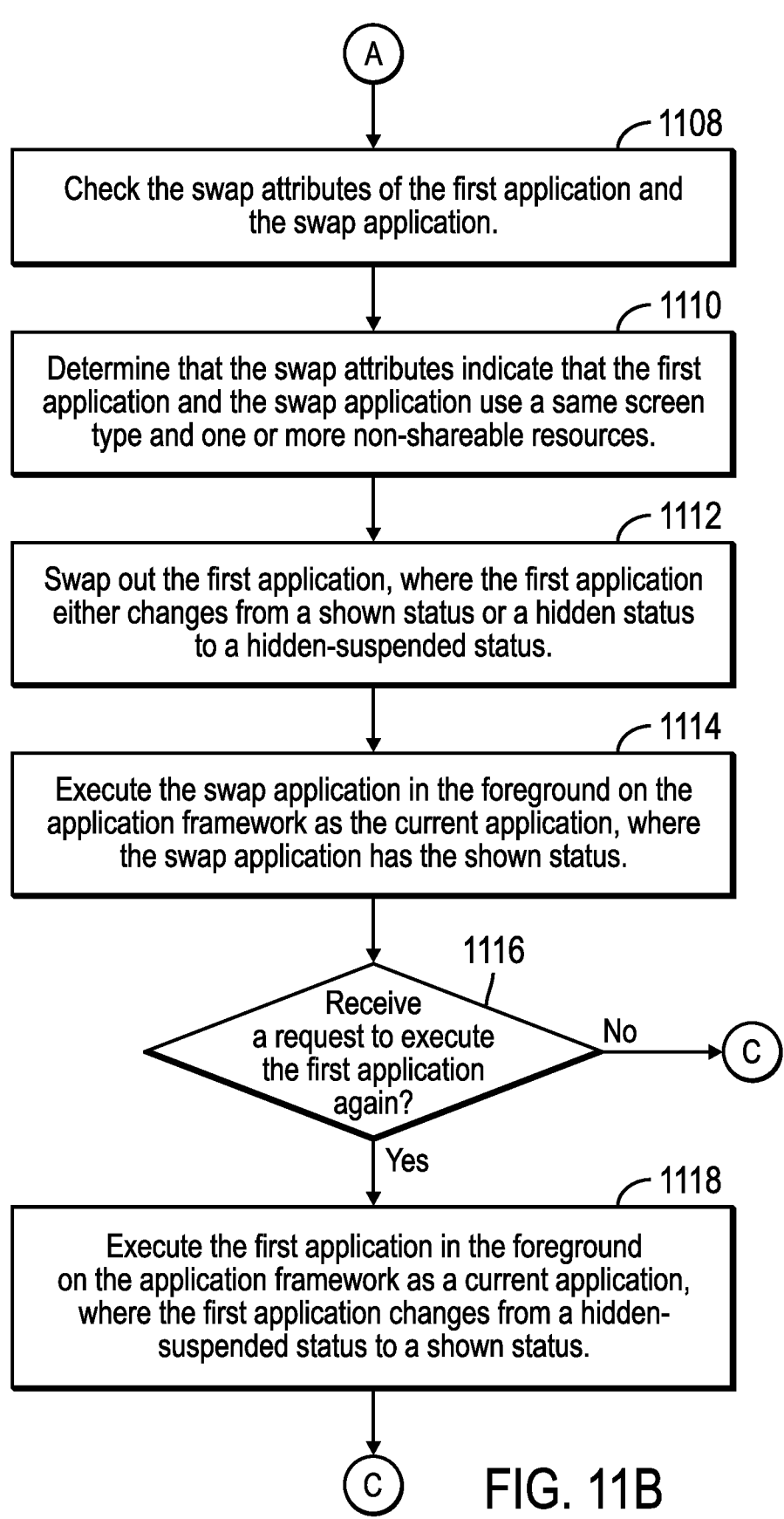
Figure 11C:
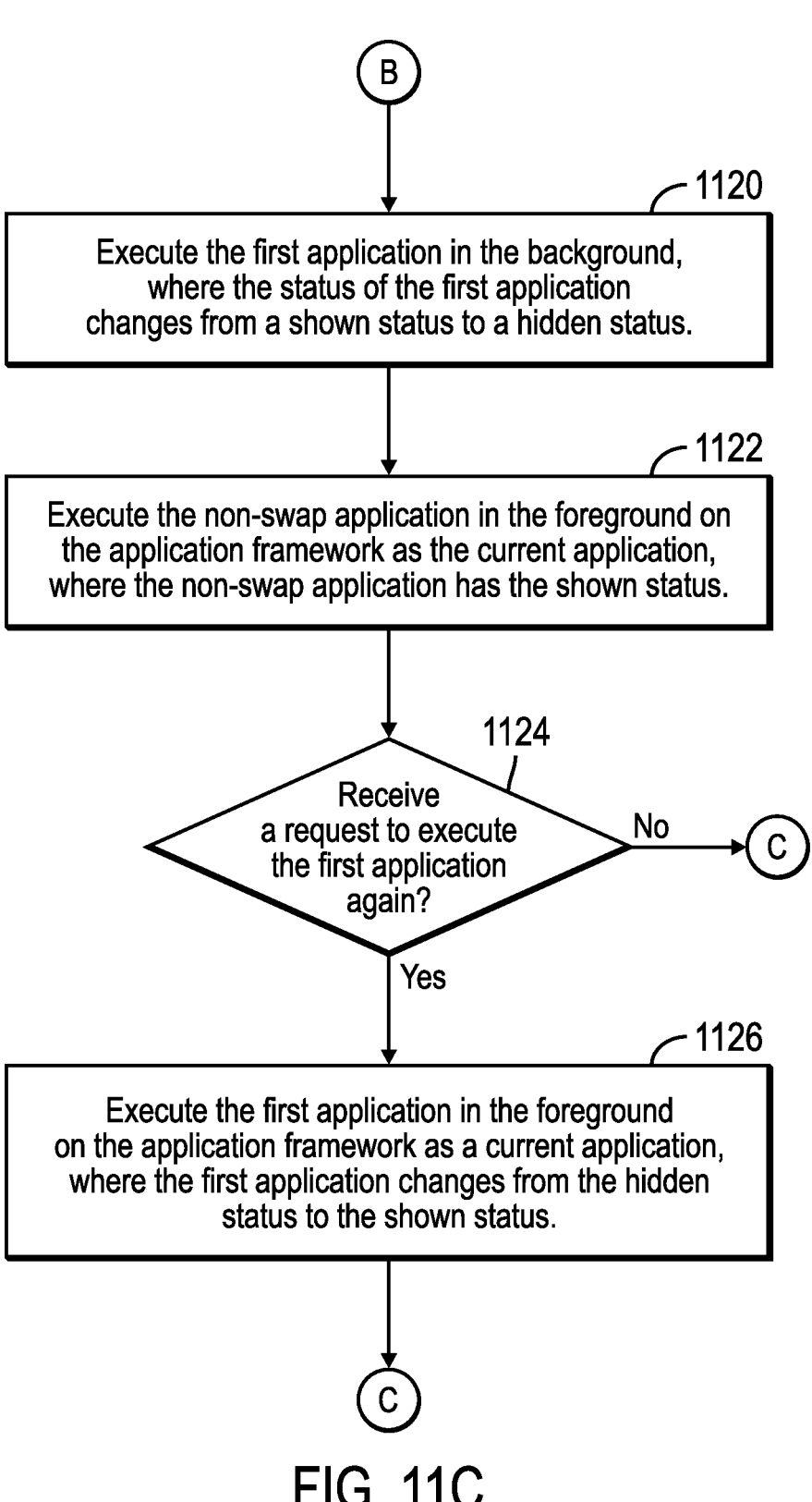

FIGS. 11A, 11B, and 11C illustrate, in a flowchart, operations for executing applications on a same framework in accordance with certain embodiments. In FIG. 11A, control begins at block 1100 with the application swapping code 200 receiving a request to execute a first application on an application framework. In block 1102, the application swapping code 200 executes the first application in the foreground on the application framework as a current application, where the first application has a shown status.

In block 1104, the application swapping code 200 determines whether a request to execute a swap application that is the trigger of a swap has been received. If so, processing continues to block 1108 (FIG. 11B), otherwise, processing continues to block 1106.

In block 1106, the application swapping code 200 determines whether a request to execute a non-swap application that is not the trigger of a swap has been received. If so, processing continues to block 1120 (FIG. 11C), otherwise, processing continues to block 1104. In certain embodiments, while the current application (e.g., the first application) is executing, the application swapping code 200 performs the checks of blocks 1104 and 1106 periodically.

In block 1108, the application swapping code 200 checks the swap attributes of the first application and the swap application. In block 1110, the application swapping code 200 determines that the swap attributes indicate that the first application and the swap application use a same screen type and one or more non-shareable resources. In block 1112, the application swapping code 200 swaps out the first application, where the first application either changes from the shown status or a hidden status to a hidden-suspended status. In block 1114, the application swapping code 200 executes the swap application in the foreground on the application framework as the current application, where the swap application has the shown status.

In block 1116, the application swapping code 200 determines whether a request to execute the first application again has been received. If so, processing continues to block 1118, otherwise, processing continues to block 1104 (FIG. 11A). In certain embodiments, while the current application (e.g., the swap application) is executing, the application swapping code 200 performs the checks of blocks 1104 and 1106 periodically.

In block 1118, the application swapping code 200 executes the first application in the foreground on the application framework as a current application, where the first application changes from the hidden-suspended status to the shown status. In certain embodiments, the application swapping code 200 stores an application logic of the swap application in the suspended application logic pool 270, where the swap application changes from the shown status to the hidden-suspended status.

In block 1120, the application swapping code 200 executes the first application in the background, where the status of the first application changes from the shown status to the hidden status.

In block 1122, the application swapping code 200 executes the non-swap application in the foreground on the application framework as the current application, where the non-swap application has the shown status.

In block 1124, the application swapping code 200 determines whether a request to execute the first application again has been received. If so, processing continues to block 1126, otherwise, processing continues to block 1104 (FIG. 11A). In certain embodiments, while the current application (e.g., the non-swap application) is executing, the application swapping code 200 performs the checks of blocks 1104 and 1106 periodically.

In block 1126, the application swapping code 200 executes the first application in the foreground on the application framework as a current application, where the first application changes from the hidden status to the shown status. Processing continues from block 1126 to block 1104 (FIG. 11A). In certain embodiments, the application swapping code 200 executes the non-swap application in the background, where the non-swap application changes from the shown status to the hidden status.

Figure 12:
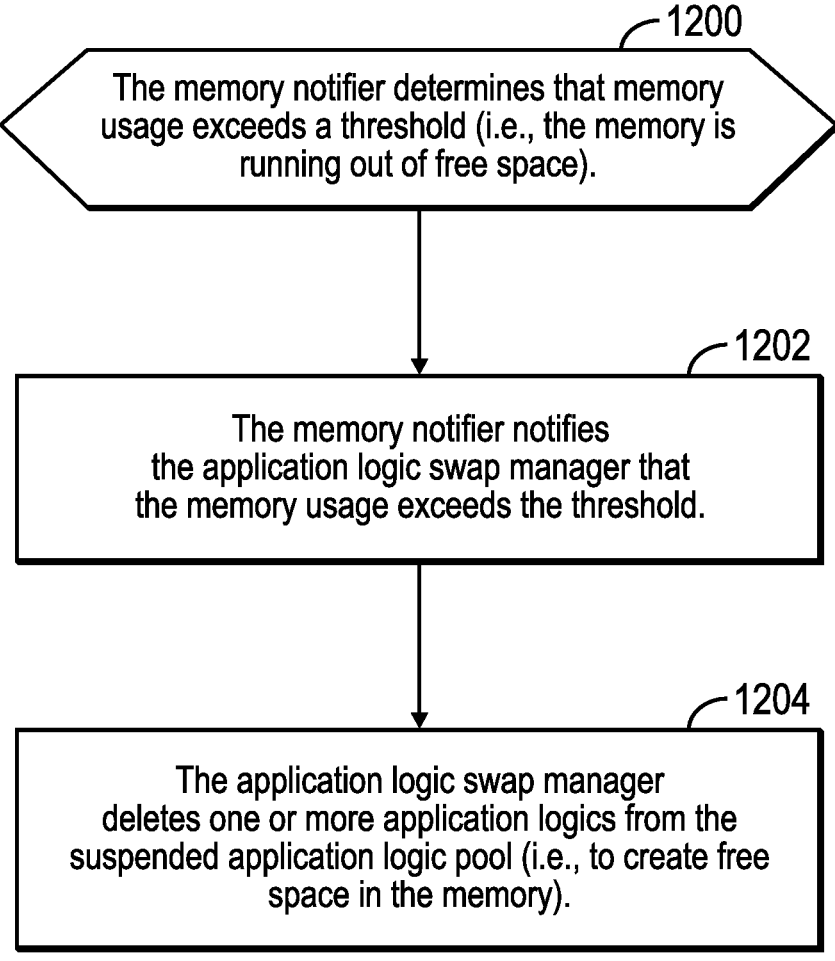
FIG. 12 illustrates, in a flowchart, operations for making free space in memory in accordance with certain embodiments.

FIG. 12 illustrates, in a flowchart, operations for making free space in memory in accordance with certain embodiments. Control begins at block 1200 with the memory notifier 220 of the application swapping code 200 determining that memory usage exceeds a threshold (i.e., the memory is running out of free space). In block 1202, the memory notifier 220 notifies the application logic swap manager 230 of the application swapping code 200 that the memory usage exceeds the threshold. In block 1204, the application logic swap manager 230 deletes one or more application logics from the suspended application logic pool (i.e., to create free space in the memory).

FIG. 13 illustrates, in a flowchart, operations for swapping applications in accordance with certain embodiments. Control begins at block 1300 with the application swapping code 200 executing a first application in a foreground on an application framework, where the first application has a shown status. In block 1302, the application swapping code 200 receives a request to execute a swap application. In block 1304, the application swapping code 200 determines that the first application and the swap application use a same screen type and a same non-shareable resource. In block 1306, the application swapping code 200 stores an application logic of the first application in a suspended application logic pool, where the first application changes from the shown status to a hidden-suspended status. In block 1308, the application swapping code 200 executes the swap application in the foreground on the application framework, where the swap application has a shown status.

In certain embodiments, the application swapping code 200 swaps application logics while executing multiple application logics on a same application framework. In certain embodiments, prior to executing an application A, the swap launch manager 210 identifies a swap attribute of the application logic of application A. The swap launch manager 210 checks a swap attribute for other application logics (e.g., that are executing) to select an application logic B that is using a same screen type and a same non-sharable resource as application logic A. The swap launch manager 210 sends a request to the application logic swap manager 230 to swap application logic B to the new application logic A. The swap launch manager 210 swaps the new application logic A and the application logic B by loading the new application logic A into memory, attaching application logic A to the application framework (e.g., a base VM), and detaching the application logic B from the application framework. Then, the application A is executed by executing the application logic A loaded into the memory.

In certain embodiments, the swap launch manager 210, prior to the swapping, changes the status of the application logic B to hidden-suspended.

In certain embodiments, the detached application logic B on the memory is stored with the hidden-suspended status (so that the application B logic may be executed by attaching the application B logic to the application framework without re-loading the application B logic. In certain embodiments, the pooled application logic B is discarded in response to a notification of a shortage of memory (i.e., the memory usage exceeds a threshold).

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:

grouping a first application and a swap application that share an application framework, wherein one of the first application and the swap application executes in the application framework at a time;

executing the first application in a foreground on the application framework, wherein the first application has a shown status and is attached to the application framework; and in response to receiving a request to execute the swap application, determining that the first application and the swap application use a same screen type and a same non-shareable resource;

storing an application logic of the first application in a suspended application logic pool, wherein the first application changes from the shown status to a hidden-suspended status and is detached from the application framework; and executing the swap application in the foreground on the application framework, wherein the swap application has the shown status and is attached to the application framework.

2. The computer-implemented method of claim 1, wherein the operations further comprise:

receiving a request to execute the first application again;

storing an application logic of the swap application in the suspended application logic pool, wherein the swap application changes from the shown status to the hidden-suspended status;

retrieving the application logic of the first application from the suspended application logic pool; and executing the first application in the foreground, wherein the first application changes from the hidden-suspended status to the shown status.

3. The computer-implemented method of claim 1, wherein the operations further comprise:

in response to receiving a request to execute a non-swap application, executing the first application in a background, wherein the first application changes from the shown status to a hidden status; and executing the non-swap application in the foreground on the application framework, wherein the non-swap application has the shown status.

4. The computer-implemented method of claim 3, wherein the operations further comprise:

receiving a request to execute the first application again;

executing the first application in the foreground, wherein the first application changes from the hidden status to the shown status; and executing the non-swap application in the background, wherein the non-swap application changes from the shown status to the hidden status.

5. The computer-implemented method of claim 1, wherein the operations further comprise:

determining that memory usage exceeds a threshold; and discarding one or more application logics in the suspended application logic pool to free space in memory.

6. The computer-implemented method of claim 1, wherein memory usage comprises memory for the application framework, the first application, and the swap application.

7. The computer-implemented method of claim 1, wherein the application framework comprises a first application framework, and wherein other applications are grouped to share a second application framework.

8. A computer program product, the computer program product comprising a computer readable storage medium having program instructions embodied therewith, the program instructions executable by a processor to cause the processor to perform operations for:

grouping a first application and a swap application that share an application framework, wherein one of the first application and the swap application executes in the application framework at a time;

executing the first application in a foreground on the application framework, wherein the first application has a shown status and is attached to the application framework; and in response to receiving a request to execute the swap application, determining that the first application and the swap application use a same screen type and a same non-shareable resource;

storing an application logic of the first application in a suspended application logic pool, wherein the first application changes from the shown status to a hidden-suspended status and is detached from the application framework; and executing the swap application in the foreground on the application framework, wherein the swap application has the shown status and is attached to the application framework.

9. The computer program product of claim 8, wherein the program instructions are executable by the processor to cause the processor to perform further operations for:

receiving a request to execute the first application again;

storing an application logic of the swap application in the suspended application logic pool, wherein the swap application changes from the shown status to the hidden-suspended status;

retrieving the application logic of the first application from the suspended application logic pool; and executing the first application in the foreground, wherein the first application changes from the hidden-suspended status to the shown status.

10. The computer program product of claim 8, wherein the program instructions are executable by the processor to cause the processor to perform further operations for:

in response to receiving a request to execute a non-swap application, executing the first application in a background, wherein the first application changes from the shown status to a hidden status; and executing the non-swap application in the foreground on the application framework, wherein the non-swap application has the shown status.

11. The computer program product of claim 10, wherein the program instructions are executable by the processor to cause the processor to perform further operations for:

receiving a request to execute the first application again;

executing the first application in the foreground, wherein the first application changes from the hidden status to the shown status; and executing the non-swap application in the background, wherein the non-swap application changes from the shown status to the hidden status.

12. The computer program product of claim 8, wherein the program instructions are executable by the processor to cause the processor to perform further operations for:

determining that memory usage exceeds a threshold; and discarding one or more application logics in the suspended application logic pool to free space in memory.

13. The computer program product of claim 10, wherein memory usage comprises memory for the application framework, the first application, and the swap application.

14. The computer program product of claim 10, wherein the application framework comprises a first application framework, and wherein other applications are grouped to share a second application framework.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

grouping a first application and a swap application that share an application framework, wherein one of the first application and the swap application executes in the application framework at a time;

executing the first application in a foreground on the application framework, wherein the first application has a shown status and is attached to the application framework; and in response to receiving a request to execute swap application, determining that the first application and the swap application use a same screen type and a same non-shareable resource;

storing an application logic of the first application in a suspended application logic pool, wherein the first application changes from the shown status to a hidden-suspended status and is detached from the application framework; and executing the swap application in the foreground on the application framework, wherein the swap application has the shown status and is attached to the application framework.

16. The computer system of claim 15, wherein the program instructions perform operations further comprising:

receiving a request to execute the first application again;

storing an application logic of the swap application in the suspended application logic pool, wherein the swap application changes from the shown status to the hidden-suspended status;

retrieving the application logic of the first application from the suspended application logic pool; and executing the first application in the foreground wherein the first application changes from the hidden-suspended status to the shown status.

17. The computer system of claim 15, wherein the program instructions perform operations further comprising:

in response to receiving a request to execute a non-swap application, executing the first application in a background, wherein the first application changes from the shown status to a hidden status; and executing the non-swap application in the foreground on the application framework, wherein the non-swap application has the shown status.

18. The computer system of claim 17, wherein the program instructions perform operations further comprising:

receiving a request to execute the first application again;

executing the first application in the foreground, wherein the first application changes from the hidden status to the shown status; and executing the non-swap application in the background, wherein the non-swap application changes from the shown status to the hidden status.

19. The computer system of claim 15, wherein the program instructions perform operations further comprising:

determining that memory usage exceeds a threshold; and discarding one or more application logics in the suspended application logic pool to free space in memory.

20. The computer system of claim 15, wherein memory usage comprises memory for the application framework, the first application, and the swap application.

* * * * *